United States Patent [19]
Medovar et al.

[11] 3,912,847
[45] Oct. 14, 1975

[54] DEVICE FOR SECURING AN ELECTRODE AND SUPPLYING ELECTRIC CURRENT THERETO

[76] Inventors: Boris Izrailevich Medovar, bulvar Lesi Ukrainki, 2, kv. 8; Georgy Alexandrovich Boiko, ulitsa Vladimire- Lybedskaya, 16, kv. 106; Ilya Iosifovich Kumysh, Vozdukhoflotsky prospekt, 42, kv. 51; Valery Alexandrovich Prikhodko, bulvar Davydova, 7. kv. 4; Jury Fedorovich Alferov, bulvar Lepse, 29, kv. 64, all of, Kiev; Valentin Alexandrovich Nosanov, ulitsa Telmana, 58/3, kv. 13, Leningrad; Volf Iudovich Rabinovich, ulitsa Gagarina, 39, kv. 43; Igor Alexandrovich Svitenko, ulitsa Gagarina 52, kv. 11, both of Chekhov, Moskovski oblasti, all of U.S.S.R.

[22] Filed: Aug. 20, 1973

[21] Appl. No.: 389,497

Related U.S. Application Data
[63] Continuation of Ser. No. 295,464, Oct. 6, 1972, abandoned, which is a continuation of Ser. No. 163,751, July 19, 1971, abandoned.

[52] U.S. Cl. .................................................. 13/16
[51] Int. Cl. ............................................. H05b 7/10
[58] Field of Search .................................. 13/14–17

[56] References Cited
UNITED STATES PATENTS

| | | | |
|---|---|---|---|
| 628,373 | 7/1899 | VanDenbergh | 13/16 |
| 2,405,403 | 8/1946 | Chronis | 13/16 |

*Primary Examiner*—R. N. Envall, Jr.
*Attorney, Agent, or Firm*—Holman & Stern

[57] ABSTRACT

A device for securing an electrode and supplying electric current thereto, designed for use, mainly, in electroslag remelting apparatus, comprising a current-conducting holder whose outer surface has a spherical shape and in which holder the electrode is secured, and a seat adapted for said holder to rest thereagainst.

4 Claims, 1 Drawing Figure

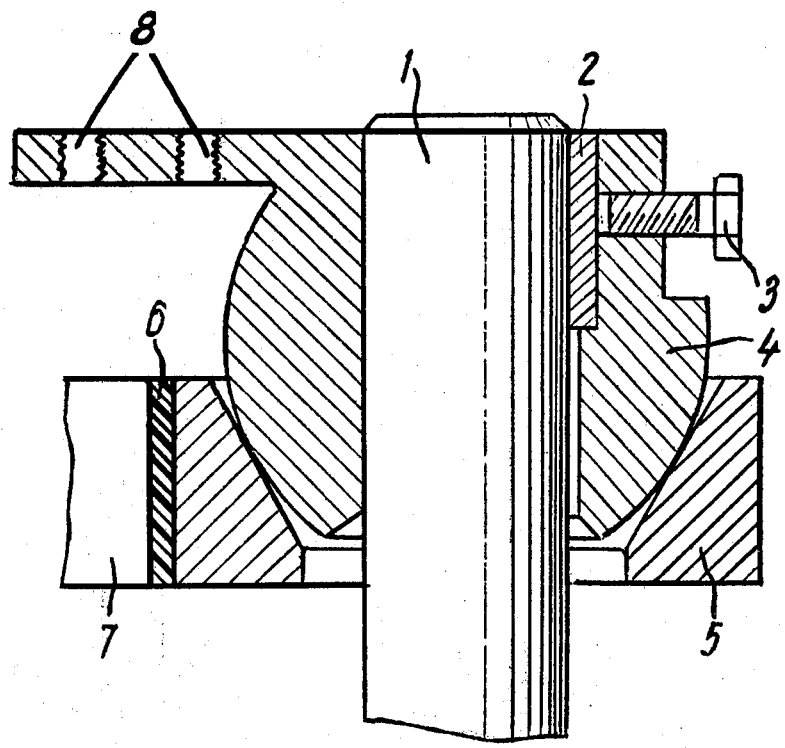

DEVICE FOR SECURING AN ELECTRODE AND SUPPLYING ELECTRIC CURRENT THERETO

This is a continuation of Ser. No. 295,464 filed Oct. 6, 1972 which is in turn a continuation of Ser. No. 163,751, filed July 19, 1971, both now abandoned.

BACKGROUND OF THE INVENTION

The present invention relates to equipment intended for use in connection with special electro-metallurgical processes of remelting consumable electrodes in crystallizers; in particular, this invention relates to devices designed for securing an electrode and supplying electric current thereto in apparatus for electroslag remelting.

There are known devices designed for securing an electrode and supplying electric current thereto, comprising a current-conducting holder with an electrode secured therein and a seat adapted for the holder to rest thereagainst.

However, such known devices are totally inefficient if the gap between the electrode and the crystallizer walls is too small. Such is the case when casting thin-walled hollow ingots or thin-walled shaped castings. A rigidly secured tubular electrode may press against the crystallizer wall in the course of melting and cause short-circuiting. Not even the most strict tolerances with respect to the electrode dimensions, as well as its careful assembly and positioning in the electrode holder, can guarantee full protection to the melting process against disturbance.

SUMMARY OF THE INVENTION

It is an object of the present invention to eliminate the afore-listed disadvantages of known devices.

This invention provides a device for securing an electrode and supplying electric current thereto, which allows melting in a narrow gap without disturbing the conditions of the process in the course of production of shaped, for example, hollow castings.

The object of the present invention is attained in a device for securing an electrode and supplying electric current to the latter, intended for use mainly in apparatus for electroslag remelting, comprising a current-conducting holder with an electrode secured therein and a seat adapted for the holder to rest thereagainst, and wherein according to the present invention, the outer surface of the holder has a spherical shape.

BRIEF DESCRIPTION OF THE DRAWINGS

The invention will be more apparent upon considering a following detailed description of the preferred embodiment thereof, with due reference to the accompanying drawing which illustrates diagrammatically in section the device for securing an electrode and supplying electric current to the latter, according to the present invention.

DETAILED DESCRIPTION OF PREFERRED EMBODIMENTS

Referring now to the accompanying drawing, a stock head 1 of an electrode is pressed, through the intermediary of a pressure means comprising a plate 2 and a bolt 3, to a current-conducting holder 4 having terminal means 8 for supplying current thereto and being of a spherical shape and arranged freely in a seat 5 which seat, for example, a tapered shape. The tapered seat 5 is insulated by means of a spacer 6 from a bracket 7 of an electroslag remelting apparatus.

The device according to the present invention operates in the following manner.

Upon deflection of the electrode axis in the course of electroslag remelting from the initial position while adjusting the electrode in the crystallizer, the current-conducting holder 4 turns without obstruction on the tapered surface of the seat 5 in contact with said holder, and the electrode is soon returned to the required position.

The use of the herein-disclosed device for securing an electrode allows execution of the melting process at practically any values of the gap between the electrode and the crystallizer, however small this gap, and the device has application in apparatus for electroslag remelting and in furnaces for vacuum-arc and plasma-arc remelting and the like.

What is claimed is:

1. A device for securing an electrode and supplying electric current thereto, intended for use mainly in apparatus for electroslag remelting, comprising: a current-conducting holder whose outer surface has a spherical shape; an electrode conductively secured in said holder; means for effecting electrical connection with said holder for supplying electric current therethrough to said electrode; and a seat adapted for said holder to rest thereagainst on a spherical region of the current-conducting holder.

2. A device as in claim 1, wherein said seat is substantially conical, converging in a downward direction.

3. A device as in claim 1, which further comprises a pressure pad and a screw means to secure the electrode in said electrode holder.

4. A device as claimed in claim 1, wherein an insulating means is provided between said electrode holder and a support bracket on which the electrode holder is mounted.

* * * * *